United States Patent
Dixon et al.

(10) Patent No.: US 11,536,599 B2
(45) Date of Patent: Dec. 27, 2022

(54) ULTRASONIC FLUID FLOW MEASURING METHOD AND APPARATUS FOR INFERRING FLOW SPEED RELATIVE TO THE PHASE SHIFT BETWEEN SIGNALS FROM THE TRANSDUCERS

(71) Applicant: The University of Warwick, Coventry (GB)

(72) Inventors: Steve Dixon, Coventry (GB); David Greenshields, Coventry (GB)

(73) Assignee: THE UNIVERSITY OF WARWICK, Coventry Warwickshire (GB)

(*) Notice: Subject to any disclaimer, the term of this patent is extended or adjusted under 35 U.S.C. 154(b) by 153 days.

(21) Appl. No.: 16/982,398

(22) PCT Filed: Mar. 18, 2019

(86) PCT No.: PCT/GB2019/050756
§ 371 (c)(1),
(2) Date: Sep. 18, 2020

(87) PCT Pub. No.: WO2019/180415
PCT Pub. Date: Sep. 26, 2019

(65) Prior Publication Data
US 2021/0072058 A1    Mar. 11, 2021

(30) Foreign Application Priority Data
Mar. 20, 2018  (GB) ..................... 1804449

(51) Int. Cl.
G01F 1/66 (2022.01)
G01F 1/667 (2022.01)

(52) U.S. Cl.
CPC .................... G01F 1/667 (2013.01)

(58) Field of Classification Search
None
See application file for complete search history.

(56) References Cited

U.S. PATENT DOCUMENTS

| | | |
|---|---|---|
| 2,724,269 A | 11/1955 | Kalmus |
| 3,935,735 A | 2/1976 | Lee |
| 4,468,971 A | 9/1984 | Herzl et al. |
| 4,527,432 A | 7/1985 | Gutterman |
| 4,527,433 A * | 7/1985 | Gutterman ............ G01F 1/667 73/861.28 |

(Continued)

FOREIGN PATENT DOCUMENTS

| | | |
|---|---|---|
| DE | 2724661 A1 | 11/1978 |
| EP | 0031102 A2 | 7/1981 |

(Continued)

OTHER PUBLICATIONS

English-language abstract for JPH07167696A.

(Continued)

*Primary Examiner* — Harshad R Patel
(74) *Attorney, Agent, or Firm* — Caesar Rivise, PC (57) ABSTRACT

A method of inferring fluid flow speed through a passage comprises receiving a first signal having a frequency and phase corresponding to that of a first ultrasonic wave detected after passing through the fluid in a direction with a component opposed or aligned to a main direction of the fluid's flow. Receiving a second signal having a frequency and phase corresponding to that of a second ultrasonic wave detected after passing through the fluid in a direction with a component different to that of the first ultrasonic wave with respect to the main direction of the fluid's flow. Inferring the fluid flow speed through the passage based on the relative phase shift between the first and second signals.

18 Claims, 2 Drawing Sheets

(56) References Cited

U.S. PATENT DOCUMENTS

| | | | | | |
|---|---|---|---|---|---|
| 5,052,230 | A | * | 10/1991 | Lang | G01F 1/667 |
| | | | | | 73/861.28 |
| 6,390,999 | B1 | * | 5/2002 | Zscheile | A61M 1/3626 |
| | | | | | 604/4.01 |
| 8,224,621 | B2 | * | 7/2012 | Ajay | G01F 1/667 |
| | | | | | 702/179 |
| 2010/0095782 | A1 | * | 4/2010 | Ferencz | G01F 1/667 |
| | | | | | 73/861.28 |
| 2018/0164136 | A1 | * | 6/2018 | Gestner | G01F 1/667 |
| 2020/0209030 | A1 | * | 7/2020 | Kleinitz | G01F 1/667 |

FOREIGN PATENT DOCUMENTS

| | | | |
|---|---|---|---|
| EP | 0200896 | A2 | 12/1986 |
| EP | 0273385 | A2 | 7/1988 |
| GB | 1482014 | | 8/1977 |
| GB | 2099146 | A | 12/1982 |
| JP | 58176522 | A | 10/1983 |
| JP | 6029616 | A | 2/1985 |
| JP | 07167696 | A | 4/1995 |

OTHER PUBLICATIONS

English-language abstract for JPS6029616A.
English-language abstract for JPS58176522A.
English-language machine translation for DE2724661.
UK Search Report for Application GB1804449.5 dated Aug. 30, 2018.
International Search Report for PCT/GB2019/050756 dated May 31, 2019.

\* cited by examiner

ULTRASONIC FLUID FLOW MEASURING METHOD AND APPARATUS FOR INFERRING FLOW SPEED RELATIVE TO THE PHASE SHIFT BETWEEN SIGNALS FROM THE TRANSDUCERS

CROSS-REFERENCE TO RELATED APPLICATIONS

This application is a U.S. National Phase Application of PCT/GB2019/050756, filed Mar. 18, 2019, which claims priority to GB 1804449.5, filed Mar. 20, 2018, the contents of which applications are incorporated herein by reference in their entireties for all purposes.

FIELD OF THE INVENTION

The present disclosure relates to inferring fluid flow speed and specifically to a method of inferring fluid flow speed, a fluid flow speed detection apparatus, a computer program, a non-transitory computer readable storage medium and a signal. The disclosure may have particular application in inferring fluid flow speed in a pipe using clamp-on ultrasonic transducers, but this is not intended to be limiting. The disclosure may for instance alternatively be applied to 'wetted' ultrasonic transducers and/or to inferring fluid flow speed in shafts (e.g. mine shafts), tunnels or ducting (e.g. for air conditioning).

BACKGROUND

Fluid flow speed in passages is measured by a number of techniques, including methods which involve measuring the transit time of ultrasound through the passage. In such systems, ultrasound may be propagated along two paths at an angle to the main direction of flow in the passage, one in a direction partially opposed to the direction of flow and one in a direction partially aligned with it. When ultrasound is propagated in a direction with a component of velocity aligned with the flow direction, the ultrasonic wave travels a fixed path in a shorter time than when the sound is propagated in a direction with a component of velocity opposed to the flow direction.

The transit time difference between the ultrasonic waves travelling in the general upstream and downstream directions is usually calculated by digitising the received ultrasonic signals and then processing the digital data in various different ways. Signal encoding is also used, particularly in situations where the signal to noise ratio may make it difficult to distinguish ultrasonic wave arrival in the raw time domain data. The electrical hardware and devices required to digitise and then perform signal processing on the electrical signals detected by the ultrasonic transducers can use a significant amount of electrical power. This may be particularly problematic where battery powered operation is desired (e.g. in a clamp-on transducer system). Furthermore the cost of the particular electronic components, the component count, size and complexity required to perform the computationally expensive signal processing may be significant.

SUMMARY OF INVENTION

According to a first aspect of the invention there is provided a method of inferring fluid flow speed through a passage comprising:
receiving a first signal having a frequency and phase corresponding to that of a detected first ultrasonic wave, the first ultrasonic wave having been detected after passing through the fluid in a direction with a component opposed or aligned to a main direction of the fluid's flow;
receiving a second signal having a frequency and phase corresponding to that of a detected second ultrasonic wave, the second ultrasonic wave having been detected after passing through the fluid in a direction with a component different to that of the first ultrasonic wave with respect to the main direction of the fluid's flow; and
inferring the fluid flow speed through the passage in accordance with the relative phase shift between the first and second signals,
where the frequencies of the first and second ultrasonic waves are substantially the same or are substantially harmonics of one another.

Such a method may reduce the processing power and/or time which might otherwise be required in methods where differences in ultrasound transit times through the fluid are used to infer fluid flow speed. Specifically, reduced processing resource may be required where the first and second signals are assessed over time to discern relative phase shift rather than there being an attempt to discern the moment in time at which the first and second ultrasonic waves are first detected.

In some embodiments the relative phase shift between the first and second signals is analysed by:
converting the first and second signals to respective first and second square wave signals;
performing gated logic to the first and second square wave signals where the gated logic used gives an output signal indicative of the relative phase shift between the first and second signals; and
integrating over an output signal from the gated logic process, the result of the integration thereby varying with the relative phase shift between the first and second signals.

This may provide a convenient and comparatively computationally inexpensive approach to inferring fluid flow speed based on relative phase shift between the first and second signals. Exemplary suitable gated logic processes are one or more of 'AND', 'OR', 'NAND', 'NOR', 'XOR' and 'XNOR'. Taking for instance an 'XOR' gate, a high (i.e. 1) output is produced where one or other of the square waves is high and the other is not. Thus, the output may indicate the extent to which amplitude peaks in the first and second square wave signals overlap. Specifically, the closer to in-phase that the first and second square wave signals are, the smaller the area under the output. Similarly taking for instance an 'AND' logic gate, a high (i.e. 1) output is produced only where both square waves are high. Thus, the output may show times at which both signals are high, and therefore the extent to which amplitude peaks in the first and second square wave signals overlap. Specifically, the closer to in-phase that the first and second square wave signals are, the greater the area under the output. As will be appreciated, all else being equal (e.g. any path length difference for the first and second ultrasonic waves, any phase discrepancy at transmission between the first and second ultrasonic waves and any time differential between transmission of the first and second ultrasonic waves) the extent to which the first and second square wave signals overlap will vary with the relative speed of the fluid flow. Thus where the difference can be calibrated based on known fluid flow speeds, the fluid flow speed in other cases can be inferred.

In an exemplary alternative approach, the gated logic may instead be performed respectively to the first square wave signal and a first reference signal as well as to the second square wave signal and a second reference signal. The relevant reference signal used may for instance be a square wave signal corresponding to the relevant ultrasonic wave at the point of its transmission. Each of the output signals from the gated logic processes may be integrated and the results compared (e.g. using a subtractor or adder (as appropriate depending on the gated logic used)) to determine the relative phase-shift and therefore infer the fluid flow speed.

In some embodiments the first and second square wave signals are generated by amplifying the first and second signals. By way of example, the application of a high gain in order to saturate the amplifier may be used to give rise to a square wave signal. Alternatively a comparator could be used to generate the square wave.

In some embodiments the first and second ultrasonic waves are transmitted and/or received at substantially the same time. This may increase the accuracy of the inferred fluid flow speed because the fluid flow speed may be less likely to have changed between the passage of the respective first and second ultrasonic waves.

In some embodiments the method comprises transmitting the first and second ultrasonic waves with no phase difference between them. This may be advantageous where the fluid can be flowing in either direction, since it may mean that the maximum speed that can be detected in either direction is the same. Additionally, transmitting with no phase difference may be convenient where first and second ultrasonic transmitters (for transmitting the first and second ultrasonic waves respectively) are driven by the same pulse and therefore the same voltage.

In some embodiments only portions of the first and second signals received are used, or only a portion of the output signal is used, in inferring the fluid flow speed. It may be for instance that portions of the relevant signals or signal are considered in accordance with a predetermined time window duration or else in accordance with a predefined number of peaks/troughs/oscillations. This may be the case even where the first and second ultrasonic waves are transmitted and received as bursts (i.e. are already time limited). This may allow oscillations adjacent to the beginning and/or end of the first and/or second signals, which may be more prone to noise, to be discounted. Furthermore, consideration of the number of peaks, troughs and/or oscillations within a time window may identify instances where the combined phase shift between the first and second ultrasound waves is 360° or greater. This may allow a determination to be made as to which of a number of possible fluid flow speeds is to be inferred.

In some embodiments the portion of the first and second signals received that are used, or the portion of the output signal that is used, is decreased in terms of duration where the method and/or another process indicates that the rate of change of the fluid flow speed has increased or is increasing. Similarly the duration may be increased where the method and/or another process indicates that the rate of change of the fluid flow speed has decreased or is decreasing. A larger time window or longer signal burst may lead to greater accuracy to the extent that the fluid flow speed remains substantially unchanged for the duration of the time window/burst. Specifically, consideration of a greater number of oscillations may reduce the impact of signal noise and other random variables. A larger time window or longer signal burst may also or alternatively be used where a more precise indication of average flow speed is desired. Nonetheless, a larger time window or longer signal burst may reduce accuracy for fluid flow speed at a given time where there is significant change in the fluid flow speed during the course of the time window/signal burst.

In some embodiments the number of times the method is performed per given time period is increased where the method and/or another process indicates that the rate of change of the fluid flow speed has increased or is increasing.

In some embodiments the first ultrasonic wave has a direction component opposed to the main direction of the fluid's flow and the second ultrasonic wave has a direction component aligned to the main direction of the fluid's flow.

In some embodiments the angle of propagation of the first ultrasonic wave with respect to the main direction of the fluid's flow is substantially equal to 180° plus the angle of propagation of the second ultrasonic wave with respect to the main direction of the fluid's flow. Thus in other words the first and second ultrasonic waves may propagate in substantially parallel but opposite directions.

In some embodiments the first and/or the second ultrasonic waves follow un-reflected paths prior to detection. The propagation paths of the first and/or the second ultrasonic waves may therefore be considered to be direct.

In some embodiments the first and/or the second ultrasonic waves follow propagation paths between locations that are circumferentially displaced with respect to the passage.

In some embodiments the first and/or the second ultrasonic waves follow propagation paths non-parallel with the main direction of the fluid's flow. Thus the propagation direction of the first and/or the second ultrasonic waves may have a radial component with respect to the passage.

In some embodiments the method comprises generating the first and second signals.

In some embodiments the first and second ultrasound waves have a frequency below 5 MHz. In some embodiments the first and second ultrasound waves have a frequency between 1 and 5 MHz. Such frequencies may be well suited to liquids. In some embodiments the first and second ultrasound waves have a frequency between 20 kHz and 1 MHz. Such frequencies may be well suited to gases. Embodiments of the present invention may facilitate use of lower frequency waves than would otherwise be desirable in a system where an attempt is made to measure ultrasonic signal time of arrival.

In some embodiments the method comprises transmitting the first and second ultrasonic waves.

According to a second aspect of the invention there is provided a fluid flow speed detection apparatus arranged to infer fluid flow speed through a passage comprising:
  at least one input arranged to:
    receive a first signal having a frequency and phase corresponding to that of a detected first ultrasonic wave, the first ultrasonic wave having been detected after passing through the fluid in a direction with a component opposed or aligned to a main direction of the fluid's flow; and
    receive a second signal having a frequency and phase corresponding to that of a detected second ultrasonic wave, the second ultrasonic wave having been detected after passing through the fluid in a direction with a component different to that of the first ultrasonic wave with respect to the main direction of the fluid's flow,
  a processing means arranged to infer the fluid flow speed through the passage in accordance with the relative phase shift between the first and second signals, and an output arranged to output a data signal indicative of the inferred fluid flow speed, where the frequencies of the first and second ultrasonic waves are substantially the same or are substantially harmonics of one another.

In some embodiments, said processing means comprises an electronic processor.

In some embodiments the fluid flow speed detection apparatus comprises:
- at least one amplifier arranged to convert the first and second signals to respective first and second square wave signals;
- a logic gate having a first input to which the first square wave signal is applied and a second input to which the second square wave signal is applied where the logic gate used gives an output signal indicative of the relative phase shift between the first and second signals an integrator arranged to receive an output signal from an output of the logic gate and integrate over the output signal, the result of the integration thereby varying with the relative phase shift between the first and second signals.

In an alternative embodiment two logic gates may be provided. A first of the logic gates may have a first input to which the first square wave signal is applied and a second input to which a first reference signal is applied. A second of the logic gates may have a first input to which the second square wave signal is applied and a second input to which a second reference signal is applied. The relevant reference signal used may for instance be a square wave signal corresponding to the relevant ultrasonic wave at the point of its transmission. Each of the output signals from each of the first and second logic gates may be integrated by an integrator (or respective integrators) and the results compared (e.g. using a subtractor or adder (as appropriate depending on the logic gates used)) to determine the relative phase-shift and therefore infer the fluid flow speed.

In some embodiments the processing means is arranged to use only portions of the first and second signals received, or only a portion of the output signal, in inferring the fluid flow speed. It may be for instance that portions of the relevant signals are considered in accordance with a predetermined time window duration or else in accordance with a pre-defined number of pulses. This may be the case even where the first and second ultrasonic waves are transmitted and received as bursts (i.e. are already time limited).

In some embodiments the processing means is arranged to decrease in terms of duration the portion of the first and second signals received that are used, or the portion of the output signal that is used, where fluid flow speed detection apparatus and/or another apparatus indicates that the rate of change of the fluid flow speed has increased or is increasing. Similarly the processing means may be arranged to increase the duration where the fluid flow speed detection apparatus and/or another apparatus indicates that the rate of change of the fluid flow speed has decreased or is decreasing.

In some embodiments the processing means is arranged to increase the number of times the fluid flow speed detection apparatus is used to infer fluid flow speed per given time period where the fluid flow speed detection apparatus and/or another apparatus indicates that the rate of change of the fluid flow speed has increased or is increasing.

In some embodiments the fluid flow speed detection apparatus comprises first and second ultrasonic transmitters and first and second ultrasonic receivers, the first ultrasonic transmitter and receiver being arranged to respectively transmit and detect the first ultrasonic wave, and the second ultrasonic transmitter and receiver being arranged to respectively transmit and detect the second ultrasonic wave.

In some embodiments the first ultrasonic transmitter and first ultrasonic receiver are positioned and oriented so that the first ultrasonic receiver is arranged to receive the first ultrasonic wave subsequent to it being reflected from one or more walls of the passage on one or more occasions. In other embodiments however the first ultrasonic transmitter and first ultrasonic receiver are positioned and oriented so that the first ultrasonic receiver is arranged to receive the first ultrasonic wave subsequent to it following an un-reflected path between them. Thus it may be that the first ultrasonic wave is not reflected at one or more walls of the passage before detection. The path may instead be direct. Additionally or alternatively the second ultrasonic transmitter and second ultrasonic receiver are positioned and oriented so that the second ultrasonic receiver is arranged to receive the second ultrasonic wave subsequent to it being reflected from one or more walls of the passage on one or more occasions. In other embodiments however the second ultrasonic transmitter and second ultrasonic receiver are positioned and oriented so that the second ultrasonic receiver is arranged to receive the first ultrasonic wave subsequent to it following an un-reflected path between them. Thus it may be that the second ultrasonic wave is not reflected at one or more walls of the passage before detection. The path may instead be direct.

In some embodiments the first ultrasonic transmitter and first ultrasonic receiver are circumferentially displaced with respect to each other.

In some embodiments the second ultrasonic transmitter and second ultrasonic receiver are circumferentially displaced with respect to each other.

In some embodiments the first ultrasonic transmitter and first ultrasonic receiver are arranged so that the propagation direction of the first ultrasonic wave is non-parallel with the main direction of the fluid's flow. Thus the propagation direction of the first ultrasonic wave may have a radial component with respect to the passage.

In some embodiments the second ultrasonic transmitter and second ultrasonic receiver are arranged so that the propagation direction of the second ultrasonic wave is non-parallel with the main direction of the fluid's flow. Thus the propagation direction of the second ultrasonic wave may have a radial component with respect to the passage.

In some embodiments the first ultrasonic transmitter and second ultrasonic receiver are combined as a first ultrasonic transceiver and the second ultrasonic transmitter and first ultrasonic receiver are combined as a second ultrasonic transceiver.

In some embodiments the first ultrasonic transmitter and first ultrasonic receiver are arranged so that the first ultrasonic wave has a direction component opposed to the main direction of the fluid's flow and the second ultrasonic transmitter and second ultrasonic receiver are arranged so that the second ultrasonic wave has a direction component aligned to the main direction of the fluid's flow.

In some embodiments the first and second ultrasonic transmitters and first and second ultrasonic receivers are arranged so that the angle of propagation of the first ultrasonic wave with respect to the main direction of the fluid's flow is equal to 180° plus the angle of propagation of the second ultrasonic wave with respect to the main direction of the fluid's flow.

In some embodiments the first and second ultrasonic receivers are arranged to generate the first and second signals.

In some embodiments the fluid flow speed detection apparatus comprises a controller arranged to control transmission of the first and second ultrasonic waves so as they are transmitted at substantially the same time. Alternatively they may be transmitted at different times.

In some embodiments at least one of the first and second ultrasonic transmitters and/or at least one of the first and second ultrasonic receivers is arranged to be fitted externally to a wall or walls of the passage. It may be for instance that the ultrasonic transmitters and receivers are arranged to send and receive ultrasonic waves through the wall(s) of the passage. Further the ultrasonic transmitters and/or receivers may be adapted to be attached to the passage or surrounding structure elements in a retrofit and/or temporary manner. It may be convenient to power such transmitters and/or receivers by battery, and extended life for such batteries may be facilitated where computational demands are reduced as may be facilitated in accordance with the method of the first aspect and the apparatus of the second aspect.

According to a third aspect of the invention there is provided a computer program that, when read by a computer, causes performance of the method of the first aspect.

According to a fourth aspect of the invention there is provided a non-transitory computer readable storage medium comprising computer readable instructions that, when read by a computer, cause performance of the method of the first aspect.

According to a fifth aspect of the invention there is provided a signal comprising computer readable instructions, that when read by a computer, cause performance of the method of the first aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DESCRIPTION OF INVENTION

Figure 1:
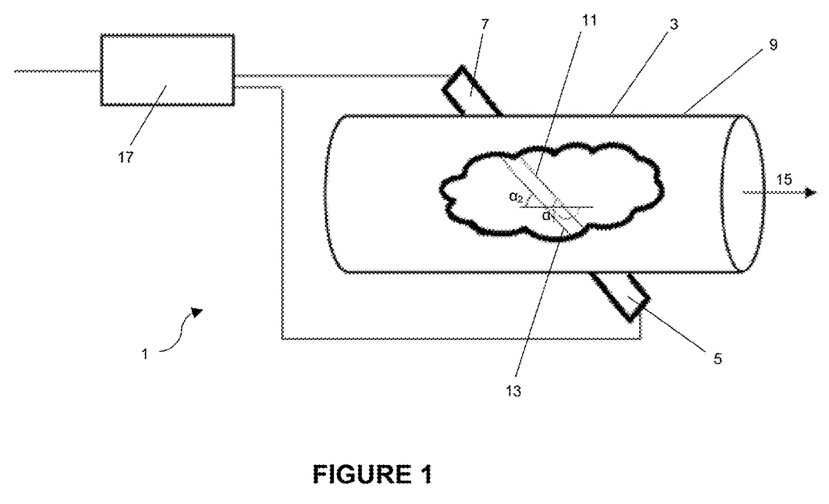
FIG. 1 shows a perspective view of a fluid flow speed detection apparatus according to an embodiment of the invention.

Referring first to FIG. 1, a fluid flow speed detection apparatus is generally shown at 1 and is installed on a passage (in this case a cylindrical pipe 3) having a fluid flowing there along and through with an unknown speed.

First 5 and second 7 ultrasonic transceivers are attached to an external wall 9 of the pipe 3. The first ultrasonic transceiver 5 has a first ultrasonic transmitter (not shown) and a second ultrasonic receiver (not shown). The second ultrasonic transceiver 7 has a second ultrasonic transmitter (not shown) and a second ultrasonic receiver (not shown). The first 5 and second 7 transceivers are positioned at diametrically opposed and axially spaced locations with respect to the pipe 3. They are further oriented and arranged so as the first ultrasonic transmitter transmits a first ultrasonic wave 11 towards the second ultrasonic receiver, and the second ultrasonic transmitter transmits a second ultrasonic wave 13 towards the first ultrasonic receiver. Such first 11 and second 13 ultrasonic waves pass through the external wall 9 twice, as well as the fluid flowing inside the pipe 3, between the respective transmitter and receiver. The path lengths respectively travelled by the first 11 and second 13 ultrasonic waves between their respective transmitters and receivers are the same.

The flow of fluid in the pipe 3 has a main direction (indicated by arrow 15) parallel to the external wall 9 of the pipe 3. As will be appreciated, because the first 11 and second 13 ultrasonic waves propagate along paths which are oblique to the main direction 15 and in opposite directions to one another, the first ultrasonic wave 11 has a direction component opposed to the main direction 15 of the fluid's flow and the second ultrasonic wave 13 has a direction component aligned to the main direction 15 of the fluid's flow. Furthermore, the angle of propagation $\alpha_1$ of the first ultrasonic wave 11 with respect to the main direction 15 of the fluid's flow is equal to the angle of propagation $\alpha_2$ of the second ultrasonic wave 13 with respect to the main direction 15 of the fluid's flow.

First 5 and second 7 ultrasonic transceivers are connected to a processor 17 arranged to infer the fluid flow speed through the pipe 3 in accordance with the relative phase shift between first and second signals received from the first 5 and second 7 ultrasonic transceivers. The processor 17 also serves as a controller arranged to control transmission of the first 11 and second 13 ultrasonic waves from the first and second ultrasonic transmitters respectively. The controller causes transmission of the first 11 and second 13 ultrasonic waves by driving the first and second ultrasonic transmitters using electrical driving signals. The controller drives the first and second ultrasonic transmitter so that the first 11 and second 13 ultrasonic waves are transmitted at the same time and in phase with each other (i.e. no phase difference between them). The controller further drives the first and second ultrasonic transmitters so as the first 11 and second 13 ultrasonic waves have the same frequency. In other embodiments the first and second ultrasonic transmitters may be driven to give first and second ultrasonic waves that are of different frequencies but which are nonetheless harmonics of each other.

The processor 17 has a first input arranged to receive a first signal having a frequency and phase corresponding to that of the first ultrasonic wave 11 as detected at the second ultrasonic receiver. The processor 17 also has a second input arranged to receiver a second signal having a frequency and phase corresponding to that of the second ultrasonic wave 13 as detected at the second ultrasonic receiver. For their part, the first and second ultrasonic receivers generate the first and second signals in response to detecting respectively the second 13 and first 11 ultrasonic waves once they have passed through the fluid.

Figure 2:
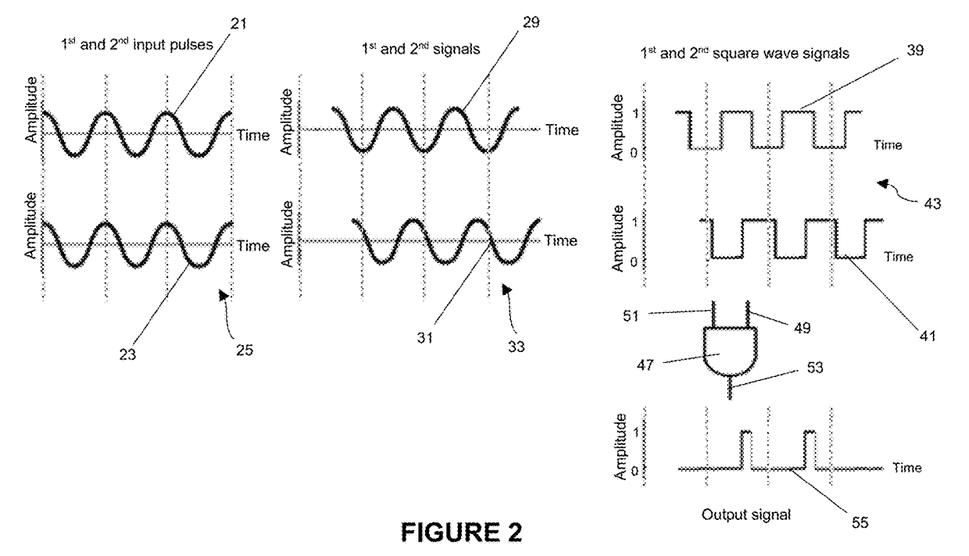
FIG. 2 depicts stages of processing for first and second signals in accordance with embodiments of the invention.
Figure 3:
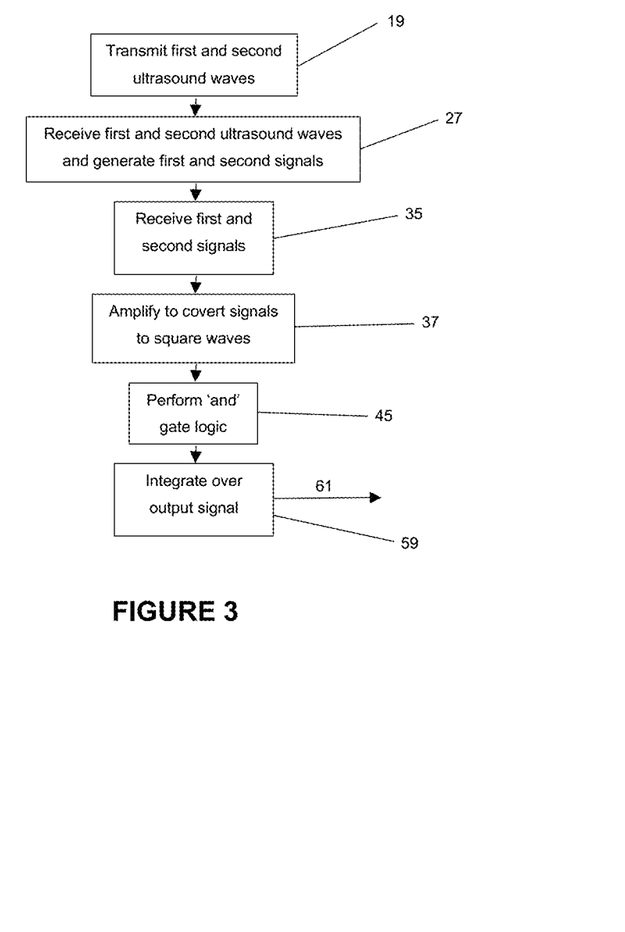
FIG. 3 shows a method of inferring fluid flow speed through a passage in accordance with an embodiment of the invention.

Referring now to FIGS. 2 and 3, the method performed by the processor 17 in order to infer the fluid flow speed from the relative phase shift between the first and second signals is discussed.

Because the direction of propagation of the first ultrasonic wave 11 has a component opposed to the main direction 15 of the fluid flow, it will take longer to travel between the first ultrasonic transmitter and second ultrasonic receiver than the time taken by the second ultrasonic wave 13 (which has a component aligned to the main direction 15) to travel between the second ultrasonic transmitter and first ultrasonic receiver. This difference in travel time will manifest a phase difference of the first 11 and second 13 ultrasonic waves as detected by the first and second ultrasonic receivers. It is this phase difference which is exploited by the processor 17 in inferring the fluid flow speed.

In a transmission step 19, the controller drives the first and second ultrasonic transmitters to transmit the first 11 and second 13 ultrasonic waves. In the embodiment shown, the controller uses identical first 21 and second 23 electrical driving signals as shown at 25 delivered at the same time. This gives first 11 and second 13 ultrasonic waves having the same phase and frequency as they are transmitted, and transmission at the same time. As explained later however, such commonality in phase, frequency, transmission time and indeed in the path length travelled by the first 11 and second 13 ultrasonic waves is not necessary.

In a detection step 27, the first 11 and second 13 ultrasonic waves are detected by the second and first ultrasonic receivers respectively and used to generate the first 29 and second 31 signals as shown at 33. As can be seen, the first 29 and second 31 signals have a relative phase shift (i.e. they are out of phase with each other).

In a reception step 35, the first 29 and second 31 signals are sent from the second and first ultrasonic receivers to the processor 17, and are received by the processor 17.

In a square wave generation step 37, the processor 17 uses an amplifier (not shown) to convert the first 29 and second 31 signals into first 39 and second 41 square wave signals respectively shown at 43.

In a logic step 45, the processor 17 selects a part of the first 39 and second 41 square wave signals corresponding to a predefined time window in terms of duration, the portions of the first 39 and second 41 square wave signals being temporally aligned relative to the respective transmission times of the first 11 and second 13 ultrasonic waves. In the logic step 45, the processor 17 also processes the first 39 and second 41 square wave signals using an 'AND' gate 47. The 'AND' gate 47 has a first input 49 to which the first square wave signal 39 is applied and a second input 51 to which the second square wave signal 41 is applied for a period falling within the predefined time window. The 'AND' gate 47 also has an output 53 from which it outputs an output signal 55 corresponding to the result of the application of the 'AND' logic. In accordance with the 'AND' gate logic a high (i.e. 1) output is produced only where both first 39 and second 41 square wave signals are high. The output signal 55 therefore shows times at which both square wave signals 39, 41 are high, and therefore the extent to which amplitude peaks in the first 39 and second 41 square wave signals overlap. The degree of overlap will vary with the phase difference between the first 29 and second 31 signals, which itself will vary in dependence on the speed of fluid flow through the pipe 3.

In an integration step 59, the processor uses an integrator to determine the area under the output signal 55 for the given time window, which is a measure of the degree of overlap between the first 39 and second 41 square wave signals. The determined area can be used to infer the speed of the fluid flow by reference to a known relationship between area and fluid flow speed previously determined in a calibration step (which may for instance utilise an alternative method of determining the speed of a fluid flow). Optionally the method may be repeated one or more times, and an average inferred speed calculated by the processor for a given period. The inferred speed of the fluid flow through and along the pipe 3 is then output as a data signal 61 from an output of the processor 17, which may be used to display the inferred speed to a user via one or more of various possible display/alert means and/or provided to another/wider system for use therein.

As will be appreciated, in the example given above, the time at which the first 11 and second 13 ultrasonic waves are transmitted is the same and they are also in phase with each other at transmission. The angle of propagation with respect to the main fluid flow direction and path length are also the same for the first 11 and second 13 ultrasonic waves. Nonetheless, and by way of example, in other embodiments, the times of transmission for the first 11 and second 13 ultrasonic waves may be different and/or path lengths may be different and/or there may be a relative phase-offset at the time of transmission. As long as such variables are kept consistent with the corresponding variables used during calibration, the output signal will still be indicative of fluid flow speed. The first 11 and second 13 ultrasonic waves could also have different frequencies where the frequencies are harmonics of one another.

In the example given above, 'AND' logic is used before the integration step. As will be appreciated however, alternative gated logics may be used. By way of example, use of an 'XOR' gate would give a high (i.e. 1) output where one or other of the square waves is high and the other is not. Thus, the output would indicate the extent to which amplitude peaks in the first and second square wave signals overlap. Specifically, the closer to in-phase that the first and second square wave signals are, the smaller the area under the output. This in turn would allow inference of the fluid flow speed based on calibration. Similarly, use of 'OR' logic would give an output signal indicating where neither square wave is high, and therefore is again indicative of the degree of overlap (phase shift) of the first and second signals. This in turn would allow inference of the fluid flow speed based on calibration. Similarly processing by further alternative types of logic gate (i.e. those having two inputs, one for each of the first and second square wave signals, and producing an output dependent on those two inputs) would also allow inference of the phase shift and so the fluid flow speed.

Figure 4:
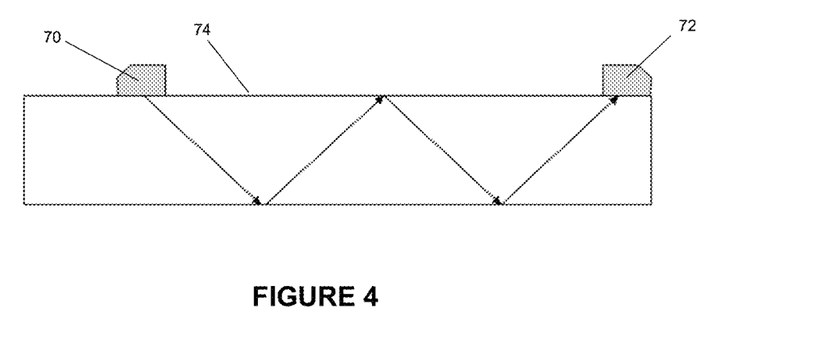
FIG. 4 shows a side view of a fluid flow speed detection apparatus according to an embodiment of the invention.

FIG. 4 shows an illustrative alternative arrangement in terms of the positioning of first 70 and second 72 ultrasonic transceivers. The first 70 and second 72 ultrasonic transceivers are in this case positioned at substantially the same circumferential position with respect to a passage (in this case a cylindrical pipe 74) through which the fluid is flowing. The first 70 and second 72 transceivers are further positioned such that an ultrasonic wave transmitted from one is received by the other after a plurality (in this case three) reflection events on an internal surface of the cylindrical pipe 74. Such an arrangement may provide a more sensitive fluid flow speed detection apparatus, because the path length of the ultrasonic waves through the fluid is longer. Nonetheless signal noise may also be more evident.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of inferring fluid flow speed through a passage comprising:
   receiving a first signal having a frequency and phase corresponding to that of a detected first ultrasonic wave, the first ultrasonic wave having been detected after passing through the fluid in a direction with a component that is the same as a main direction of fluid flow or in a direction opposed to the main direction of the fluid flow;
   receiving a second signal having a frequency and phase corresponding to that of a detected second ultrasonic wave, the second ultrasonic wave having been detected after passing through the fluid in a direction with a component different to that of the first ultrasonic wave with respect to the main direction of the fluid's flow;
   converting the first and second signals to respective first and second square wave signals;
   performing gated logic to the first and second square wave signals using a logic gate having a first input to which the first square wave signal is applied and a second input to which the second square wave signal is applied where the logic gate used gives an output signal indicative of the relative phase shift between the first and second signals;
   integrating over an output signal from the gated logic process, the result of the integration thereby varying with the relative phase shift between the first and second signals; and
   inferring the fluid flow speed through the passage in accordance with the relative phase shift between the first and second signals,
   wherein the frequencies of the first and second ultrasonic waves are substantially the same or are substantially harmonics of one another.

2. A method according to claim 1 where the first and second square wave signals are generated by amplifying the first and second signals.

3. A method according to claim 1 where the first and second ultrasonic waves are transmitted and/or received at substantially the same time.

4. A method according to claim 1 where only portions of the first and second signals received are used, or only a portion of the output signal is used, in inferring the fluid flow speed.

5. A method according to claim 4, determining if the rate of change of the fluid flow has increased or is increasing, and wherein the portion of the first and second signals received that are used, or the portion of the output signal that is used, is decreased in terms of duration if it is determined that the rate of change of the fluid flow speed has increased or is increasing.

6. A method according to claim 1 where the first ultrasonic wave has a direction component opposed to the main direction of the fluid's flow and the second ultrasonic wave has a direction component aligned to the main direction of the fluid's flow.

7. A method according to claim 1 where the angle of propagation of the first ultrasonic wave with respect to the main direction of the fluid's flow is substantially equal to 180° plus the angle of propagation of the second ultrasonic wave with respect to the main direction of the fluid's flow.

8. A method according to claim 1 comprising generating the first and second signals.

9. A method according to claim 1 comprising transmitting the first and second ultrasonic waves.

10. A fluid flow speed detection apparatus arranged to infer fluid flow speed through a passage comprising:
   at least one input receiver arranged to:
      receive a first signal having a frequency and phase corresponding to that of a detected first ultrasonic wave, the first ultrasonic wave having been detected after passing through the fluid in a direction with a component opposed or aligned to a main direction of the fluid's flow; and
      receive a second signal having a frequency and phase corresponding to that of a detected second ultrasonic wave, the second ultrasonic wave having been detected after passing through the fluid in a direction with a component different to that of the first ultrasonic wave with respect to the main direction of the fluid's flow,
   at least one amplifier arranged to convert the first and second signals to respective first and second square wave signals;
   a logic gate having a first input to which the first square wave signal is applied and a second input to which the second square wave signal is applied where the logic gate used gives an output signal indicative of the relative phase shift between the first and second signals;

an integrator arranged to receive an output signal from an output of the logic gate and integrate over the output signal, the result of the integration thereby varying with the relative phase shift between the first and second signals;

a processor arranged to infer the fluid flow speed through the passage in accordance with the relative phase shift between the first and second signals, and an output arranged to output a data signal indicative of the inferred fluid flow speed, wherein the frequencies of the first and second ultrasonic waves are substantially the same or are substantially harmonics of one another.

11. An apparatus according to claim 10 where the fluid flow speed detection apparatus comprises first and second ultrasonic transmitters and first and second ultrasonic receivers, the first ultrasonic transmitter and receiver being arranged to respectively transmit and detect the first ultrasonic wave, and the second ultrasonic transmitter and receiver being arranged to respectively transmit and detect the second ultrasonic wave.

12. An apparatus according to claim 11 where the first ultrasonic transmitter and first ultrasonic receiver are positioned and oriented so that the first ultrasonic receiver is arranged to receive the first ultrasonic wave subsequent to it being reflected from one or more walls of the passage on one or more occasions.

13. An apparatus according to claim 11 where the second ultrasonic transmitter and second ultrasonic receiver are positioned and oriented so that the second ultrasonic receiver is arranged to receive the second ultrasonic wave subsequent to it being reflected from one or more walls of the passage on one or more occasions.

14. An apparatus according to claim 11 where the first ultrasonic transmitter and second ultrasonic receiver are combined as a first ultrasonic transceiver and the second ultrasonic transmitter and first ultrasonic receiver are combined as a second ultrasonic transceiver.

15. An apparatus according to claim 11 where the first ultrasonic transmitter and first ultrasonic receiver are arranged so that the first ultrasonic wave has a direction component opposed to the main direction of the fluid's flow and the second ultrasonic transmitter and second ultrasonic receiver are arranged so that the second ultrasonic wave has a direction component aligned to the main direction of the fluid's flow.

16. An apparatus according to claim 11 where the first and second ultrasonic transmitters and first and second ultrasonic receivers are arranged so that the angle of propagation of the first ultrasonic wave with respect to the main direction of the fluid's flow is equal to 180° plus the angle of propagation of the second ultrasonic wave with respect to the main direction of the fluid's flow.

17. An apparatus according to claim 11 where at least one of the first and second ultrasonic transmitters and/or at least one of the first and second ultrasonic receivers is arranged to be fitted externally to a wall or walls of the passage.

18. An apparatus according to claim 10 comprising a controller arranged to control transmission of the first and second ultrasonic waves so as they are transmitted at substantially the same time.

\* \* \* \* \*